United States Patent

Kolibas

[11] 3,891,315
[45] June 24, 1975

[54] ELECTROPHOTOGRAPHIC REPRODUCTION APPARATUS

[75] Inventor: James Andrew Kolibas, Broadview Heights, Ohio

[73] Assignee: Addressograph-Multigraph Corporation, Cleveland, Ohio

[22] Filed: Dec. 3, 1973

[21] Appl. No.: 421,121

[52] U.S. Cl. .................. 355/8; 355/11; 355/51; 355/66; 355/75
[51] Int. Cl. .......................................... G03g 15/00
[58] Field of Search ............. 355/8, 11, 51, 65, 66, 355/75

[56] References Cited
UNITED STATES PATENTS

| | | | |
|---|---|---|---|
| 2,837,966 | 6/1958 | Arnold et al. | 355/51 |
| 2,845,841 | 8/1958 | Collins | 355/51 |
| 3,076,392 | 2/1963 | Cerasani et al. | 355/11 |
| 3,135,179 | 6/1964 | Cerasani et al. | 355/8 |
| 3,256,791 | 6/1966 | Blume et al. | 355/8 X |
| 3,331,355 | 7/1967 | Donalies et al. | 355/11 X |

*Primary Examiner*—Richard A. Wintercorn
*Attorney, Agent, or Firm*—Harry M. Fleck, Jr.

[57] ABSTRACT

An electrophotographic reproduction apparatus including radiation sensitive means at a first location, radiation means for irradiating an original document to be copied at a second location spaced from the first location, an optical assembly extending between the first and second locations and generally overlying the radiation sensitive means and radiation means, and an access opening intermediate the first and second locations and generally underlying the optical assembly to provide for the loading of original documents to be copied. The originals are moved from the access opening to the radiation means in face-up orientation, allowing expeditious handling and collation while avoiding undesirable rubbing of the original against a glass window or radiation into the operator's eyes as with conventional machines.

6 Claims, 4 Drawing Figures

ELECTROPHOTOGRAPHIC REPRODUCTION APPARATUS

The present invention is generally related to electrophotography and, more particularly, to an improved electrophotographic reproduction apparatus including a unique optical arrangement and means for handling original documents and copies.

In the past, various machines have been provided for producing copies of original documents by xerography or other well known techniques. Such conventional machines have, for the most part, included optical systems which generally underlie the path which the originals follow past a radiation or illumination station. The originals were manually pressed against a glass surface or were automatically advanced over the surface in a face-down orientation for exposure. Manual handling of the originals was time consuming, particularly when making a single copy of several originals. In addition, it was necessary to lower a lid or cover after inserting each original to shield the operator's eyes from the exposure radiation. Automatic feeders for handling the originals increased the speed of operation somewhat, but caused undesirable rubbing or wiping of each original over the glass surface, causing triboelectric charges. This was often detrimental to the printed surface of the original and also caused a build up of contaminants on the glass, requiring periodic cleaning. Furthermore, with both the manual and automatic feed arrangements, the underlying optical system was intermingled with other machine components, exposing it to dust and other contaminants, such that frequent cleaning or maintenance was necessary. Since the optical system was closely mounted in the machine, such cleaning and maintenance required a considerable amount of time and expense.

Electrophotographic machines have been proposed which provide the illumination of originals in face-up orientation by scanning the original while projecting the scan onto a photosensitive drum surface. With such systems, however, the speed at which copies may be made is limited by the scanning rate which is relatively slow. Furthermore, these machines passed the original through a relatively tortuous course to an output station or tray in face-down orientation and at a location distant from the copy output station. As such, the originals came out in reverse order and the operator had to move between two different machine locations to retrieve the originals and corresponding copies. To efficiently reproduce multiple copies of a stack of originals, it was necessary to connect a costly collating machine to the copy output station.

It is an object of the present invention to provide an improved electrophotographic reproduction apparatus which overcomes the above-mentioned disadvantages of conventional copy machines.

Another object of the present invention is to provide a novel optical system which permits the high-speed irradiation of originals and handling thereof to an output station in face-up orientation.

It is a further object of the present invention to provide a unique electrophotographic reproduction apparatus with means for irradiating an original in face-up orientation without the need for closure of a lid or cover to prevent exposure of the operator's eyes.

Another object of the present invention is to provide a reproduction apparatus with versatile means for handling original documents in face-up orientation from an input station at an access opening near the center of the machine, past a radiation source, to an output station at one end of the machine.

It is a further object of the present invention to provide a reproduction machine with novel means for handling a stack of original documents in face-up orientation between an input station and an output station, while maintaining the documents in their original order, without the use of a collator.

Still another object of the present invention is to provide a versatile reproduction apparatus including means for handling originals in face-up orientation such that they do not come in contact with a glass surface, or the like, during irradiation as with conventional devices.

Yet another object of the present invention is to provide a reproduction apparatus including relatively simple and highly versatile means for handling the originals and copies and outputing such at a common station on the machine, thereby permitting convenient and expeditious removal by the operator.

It is another object of the present invention to provide an improved reproduction apparatus with an optical system which is positioned over the rest of the apparatus as a separate component where it is relatively free from contamination and may easily be removed for service when necessary.

Still further, an object of the present invention is to provide a versatile reproduction apparatus with an overhead optical assembly which is readily adjustable to change the length of the optical path for reduction purposes, or the like, and which is readily adaptable to accommodate a microfilm projector or other attachment, for image projection directly onto a light sensitive surface.

Other objects and advantages of the present invention will become apparent from the following detailed description thereof made with reference to the accompanying drawing, wherein.

Figure 1:
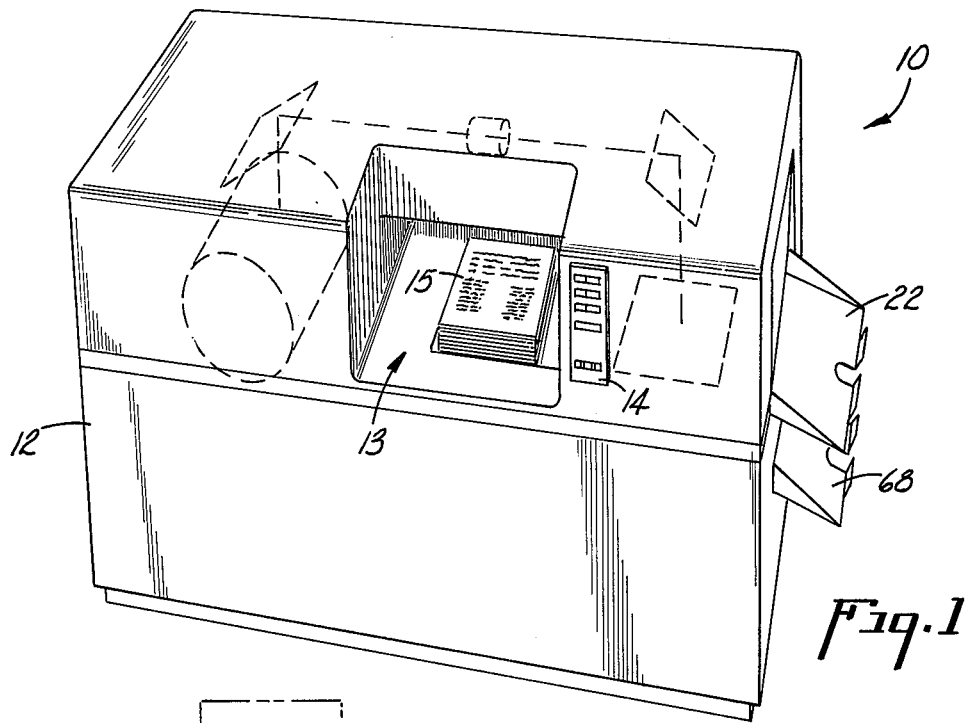
FIG. 1 is a perspective view of the electrophotographic reproduction apparatus of the present invention.
Figure 2:
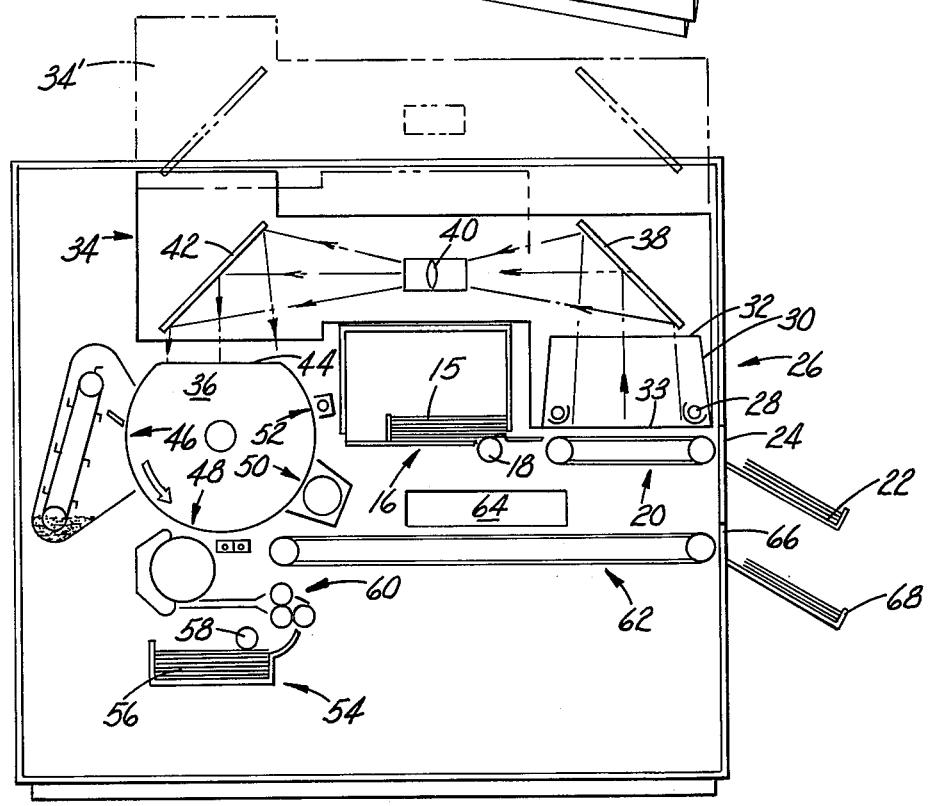
FIG. 2 is a schematic side view showing the general arrangement of the various components of the apparatus illustrated in FIG. 1, with a phantom view of the optical assembly in a raised or removed position.

Referring now, more particularly, to FIGS. 1 and 2 of the drawings, the electrophotographic reproduction apparatus of the present invention is generally indicated by the numeral 10 and includes a housing 12 with an access opening, generally indicated by the numeral 13, formed in at least one side of the housing. An operator control station 14 is provided adjacent to the access opening or at some other appropriate location for convenient operation. The access opening defines in part an input statioan for original documents, such as the stack indicated at 15. The input station is generally disposed between the opposite side walls of housing 12 and is adapted to accommodate a stack of originals in face-up orientation. By "face-up orientation" it is meant that the printed material or other indicia of the original document which is to be copied generally faces in an upward direction, but may be inclined from the horizontal. This permits the operator of the apparatus to observe the printed material upon insertion into the input station. Since originals often vary in size and it is often necessary that the operator place each original along a reference edge or line to assure that it is positioned properly on the copy, face-up orientation makes it easier for the operator to check such positioning and reduces the possibility of error in this regard.

The input station is provided with a stack feeder, generally indicated by the numeral 16, which accepts a stack of originals in face-up orientation and includes means, such as a feed roller 18, for feeding the documents, one at a time, from the bottom of the stack. Such a feeder is disclosed in pending U.S. application Ser. No. 378,782 assigned to the same assignee of the instant application. A transport 20, including a continuous belt, or other appropriate means, is provided adjacent to stack feeder 16 for receiving each original document as it is fed from the bottom of the stack. A receiving tray 22, or similar means, is provided at one end of the machine adjacent to the end of transport 20 and is disposed such that the original documents collected in the tray after passing through an exit opening 24. It will be appreciated that at least a portion of tray 22 is disposed beneath exit opening 24 such that the original documents fall into the tray under the influence of gravity and remain in face-up orientation. Thus, a stack of originals is automatically handled between the input station at 16 and the output station defined by tray 22 such that they remain in their original order.

As the original documents are advanced by transport 20, they are passed under a radiation source, generally indicated by the numeral 26, which preferably includes a pair of xenon flash tubes 28 which are well known in the art. The xenon tubes provide a flash of energy of relatively short duration which irradiates the surface of the original to provide a reflected image in a well known manner. Due to the high speed capabilities of xenon flash exposure, the originals may be advanced at a rapid rate between the input and output stations. This permits multiple copies to be made rapidly, without a costly collator attachment, by multiple runs of the stack of originals. Of course, radiation sources other than xenon flash may be utilized if it is desirable to do so.

Radiation source 26 is provided with an appropriate housing or shield 30 which substantially surrounds the radiation source on all four sides and is open on its top and bottom sides 32 and 33, respectively. Bottom opening 33 defines a radiation area which immediately overlies the original during irradiation. It will be appreciated that the bottom edges of shield 30 are spaced slightly from transport 20 by a distance sufficient to permit the original document to move beneath the radiation source without coming in direct contact with the shield or with a glass surface at the bottom thereof, if such should be provided. The originals may be held down against the transport by vacuum or other appropriate means. Thus, the originals are not wiped or rubbed over a glass surface as with a conventional machine handling the originals in face-down orientation. It should also be noted that since the radiation shield 30 open in a downward direction, the amount of radiation leakage is insignificant, whereby the problem of exposure of the operator's eyes to the radiation is effectively eliminated. With conventional machines utilizing face-down orientation, it was necessary to close a lid or cover to protect the operator from exposure to the flash or other radiation.

Radiation source 26 is associated with an optical assembly generally indicated by the numeral 34 and which overlies or generally straddles access opening 13. The optical assembly extends between the radiation area at transport 20 and a radiation sensitive means, such as a drum 36 with a photoconductive surface thereon. The radiation reflected from the original provides an image which is reflected by a stationary mirror 38 and passed through a conventional lens arrangement 40 to a second stationary mirror 42. The image is reflected downwardly to provide a focused image on an image plan at a flat surface 44 associated with drum 36. The flat photoconductive surface may be provided by controlled collapsing of a portion of the drum and pulling a photoconductive web taut when the drum is properly positioned to receive the reflected image. The structural arrangement of such a collapsible drum is disclosed in a copending application entitled "Collapsible Drum Structure" filed concurrently with the present application and assigned to the same assignee. Of course, it is not intended that the present invention be limited to the use of such a collapsible drum. The drum structure disclosed by U.S. Pat. No. 3,584,947 to Mihalik which provides a photoconductor flat by articulating a pair of arms radially outward from the drum, may be utilized, if so desired. In lieu of either of these drum structures, a continuous photoconductive web or belt, such as that disclosed by Pat. No. 3,732,005 to Lloyd, may be utilized to provide the flat photoconductive surface upon which the original image is focused.

In a typical operation, drum 36 is rotated in a counterclockwise direction past a plurality of stations, including a development station 46, transfer station 48, cleaning station 50 and charge station 52. The operations which occur at these stations are well known in the art and, as such, a detailed description of such is deemed unnecessary for the purposes of this disclosure. Briefly, these operations produce a developed image on the surface of the photoconductor in the form of toner particles, and condition the photoconductor for reexposure.

A suitable source of copy materials is provided and is generally indicated by the numeral 54. Preferably, this source includes a stack of paper 56, with a feed roller 58 resting on top of the stack. The feed roller advances a single sheet of copy material to a plurality of transport rollers 60 driven by well known means, not illustrated, to deliver the copy material sheet to transfer station 48, where it is brought into contact with a developed image area on drum 36. The developed image is transferred to the paper electrostatically, or by other appropriate techniques, and is received by a copy transport 62, which advances the copy to a fusing or fixing station 64, of a well known type. Subsequent to fusing, the copy is moved through exit opening 66 to a copy receiving tray 68 which is located adjacent to original receiving tray 22. Tray 68 is located beneath exit opening 66 to allow the copies to fall into the tray on top of each other. This provides a stack of copies in face-up orientation which corresponds to the stack of originals, which are also in face-up orientation in tray 22.

It will be appreciated that since both the copy and original receiving trays are mounted at the same end of the machine, and since the copies and originals are stacked in face-up orientation and in the same order, they may be quickly and conveniently removed from the machine by the operator. It is not necessary for the operator to walk around the machine to remove the copies and originals. Furthermore, it is unnecessary for the machine operator to sort or reorganize either the copies or the originals. By mating the bottom type stack feeder with the high speed capabilities of the multiple image area drum or a continuous belt, the need for an automatic collator is eliminated. In making several copies of a stack of originals, the stack is merely processed through the machine the required number of times, producing a collated stack of copies on each run. With conventional machines, it was necessary to make multiple copies of each sheet and couple the copy output of the machine to an automatic collator in order to obtain a plurality of collated copy stacks.

It will be appreciated that since optical assembly 34 overlies the remainder of the apparatus, it is readily accessible for easy maintenance or replacement. Preferably, the optical assembly is mounted in its own housing which is readily detachable from the main frame work such that it may be lifted for removal as indicated in dash line as 34' in FIG. 2. It will also be appreciated that since the optical assembly overlies the rest of the reproduction apparatus and is not intermingled with the other components, it is less susceptible to the accumulation of dust and other contaminants, which is often a problem with conventional machines.

Figure 3:
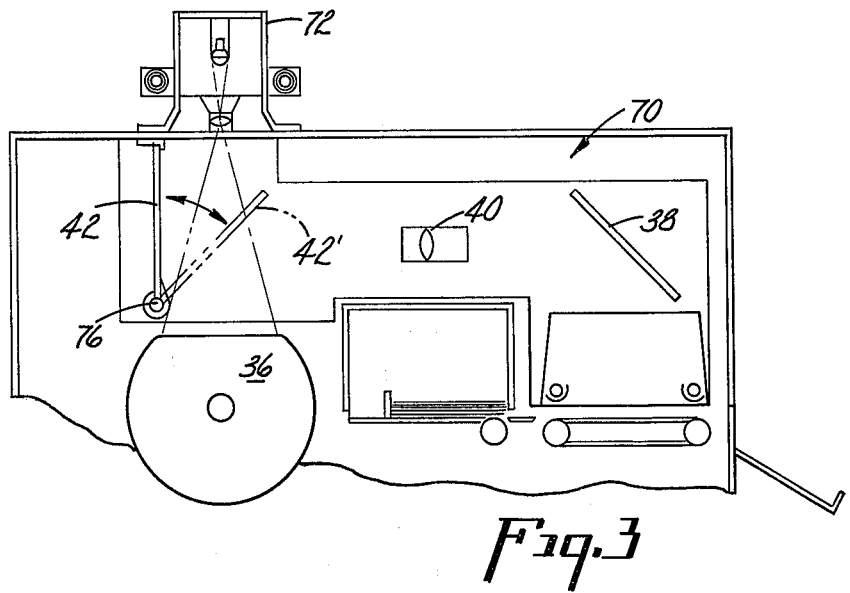
FIG. 3 is a schematic side view of a second embodiment of the optical assembly associated with the present invention including a microfilm projector attachment.

Referring now, more particularly, to FIG. 3 of the drawings, a second embodiment of the optical assembly associated with the present invention is generally indicated by the numeral 70 and is similar to the embodiment illustrated in FIG. 2, but is modified to accommodate a microfilm projector 72, or similar device, for projecting an image onto the flat surface 44 of drum 36, or other light sensitive means. Preferably, projector 72 is mounted directly above the light sensitive drum and mirror 42. For the copying of original documents, mirror 42 is normally disposed at an angle to the horizontal as indicated at 42'. Mirror 42 is mounted in place by way of a pivotal connection, such as indicated at 76, or other appropriate means which permits the mirror to be removed from the projection path of projector 72. An appropriate mechanism, not illustrated, is provided which permits the operator to move mirror 42 to an out-of-the-way position for utilization of the projector to make copies of the projected images. It will be appreciated that since the optical assembly associated with the present invention is mounted on top of the reproduction apparatus, it is possible to provide projectors of various sizes and types, interchangably, to fulfill an operator's particular needs. Such an arrangement was not possible with conventional reproduction machines which incorporated the optical system tightly intermingled with the other machine components and generally underlying the illumination source.

Figure 4:
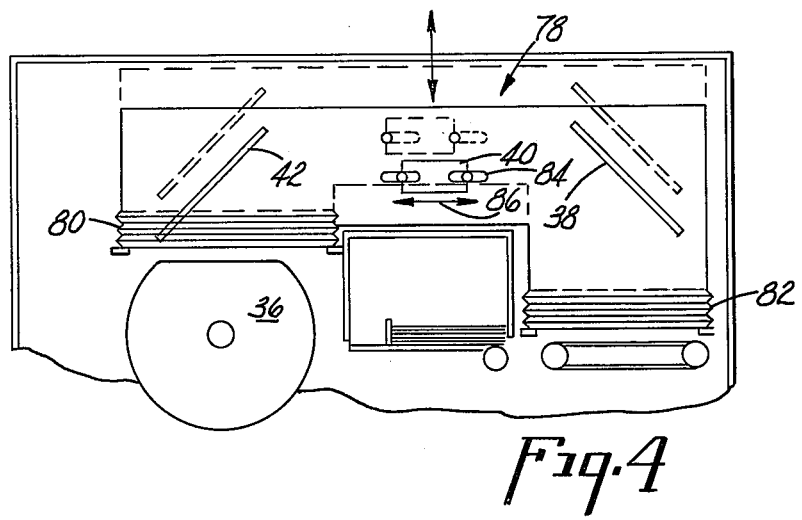
FIG. 4 is a schematic side view of a third embodiment of the optical assembly associated with the present invention which is adjustable for reduction or enlargement purposes.

With reference to FIG. 4, a third embodiment of the optical assembly associated with the present invention is illustrated and is indicated generally by the numeral 78. Optical assembly 78 is similar to that illustrated in FIG. 2, but includes a pair of bellows structures 80 and 82 which allow the assembly to be selectively raised or lowered to correspondingly change the length of the optical path between the radiation station and the image plan at the photosensitive drum. Optical assembly 78 is further provided with appropriate mounting means, such as elongated slots 84, which permit the lens arrangement 40 to be selectively displaced horizontally as indicated by arrow 86. This allows convenient focusing of the image subsequent to changing the length of the optical path. It will be appreciated that the optical assembly illustrated in FIG. 4 may be utilized for conveniently changing the size of the image for reduction or enlargement purposes. In actuality, if the apparatus is intended for reduction, the machine would be provided with a larger radiation area. Appropriate means may be provided, such as a rack and pinion arrangement for conveniently raising or lowering the optical assembly to change the length of the optical path. Various mechanical coupling, such as telescopic arrangements, may be substituted for the bellows structures illustrated in FIG. 4 in order to permit the vertical adjustment. If desired, the housing of the optical assembly may be held stationary and appropriate mounting means provided for the mirrors and lens arrangement for the raising and lowering thereof, in lieu of a bellows or telescopic housing arrangement.

From the foregoing descriptions, it will be appreciated that the optical assembly associated with the present invention, coupled with the unique face-up movement of original documents, provides many advantages not heretofore available with conventional machines. By handling the original documents in face-up orientation to the radiation source, radiation flash or leakage to the eyes of the operator is automatically eleminated without the need for a lid, as with most conventional copy machines. By feeding a stack of originals from the bottom of the stack in face-up orientation and collecting the originals and copies in a drop tray arrangement in face-up orientation, the need for an automatic collator is eliminated. It will also be appreciated that since the optical assembly associated with the present invention is mounted separate and apart from the other components of the reproduction apparatus, it is relatively free from contaminants and is readily accessible for repair or maintenance purposes. In addition, the overhead optical assembly increases the overall versatility of the reproduction apparatus by readily accommodating a microfilm projector which may be conveniently mounted in place without disassembly of the machine or disturbance of the other machine components. In addition, the optical assembly, as described above, may be readily adaptable for reduction or enlargement purposes by conveniently changing the length of the optical path and adjusting focus without disturbing the other components of the machine. The general configuration of the optical assembly provides a natural location for the original input station, thereby enhancing the compactness of the overall structure.

It is not intended that the present invention be limited to any particular type of reproduction apparatus, as such may be utilized with duplicators, as well as copiers of the coated or plain paper types. It is also pointed out that while the drawings illustrate the copy receiving tray being disposed immediately below the original receiving tray, variations of this spacial relationship, such as side by side trays, are deemed to fall within the scope of the present invention. Also, it will be appreciated that while the optical path provided is illustrated as passing almost directly over the input station, it is foreseeable that such might be shifted to the side or otherwise altered and still provide face-up exposure. While the invention has been described with reference to the structure disclosed herein, it is not intended that the present invention be confined to the details set forth, and this application is intended to cover such modifications or changes as may come within the scope of the following claims.

What is claimed is:

1. An electrophotographic reproduction apparatus for producing sheet copies of original documents, said apparatus comprising:
    a housing,
    radiation sensitive means at a first location in said housing for receiving a focussed image of the original document to be copied,
    radiation means for irradiating the original document at a second location in said housing spaced from said first location,
    an access opening formed in said housing,
    a loading station for receiving original documents to be copied in face-up orientation, said loading station being disposed in said access opening at a location generally intermediate said first and second locations,
    transport means for controlled movement of each original document from said loading station to said second location in face-up orientation,
    optical means for providing said focussed image to said radiation sensitive means including an optical path between said radiation sensitive means and said radiation means passing generally above said loading station and access opening, and
    an original document output station adjacent said second location for receiving original documents in face-up orientation,
    said transport means moving the original documents from said second location to said output station in face-up orientation subsequent to irradiation.

2. The apparatus set forth in claim 1 including a copy output station and copy transport means for controlled movement of each produced copy in face-up orientation to said copy output station,
    said original and copy output stations being immediately adjacent each other, whereby the original documents and sheet copies may be quickly and conveniently removed from the apparatus.

3. The apparatus set forth in claim 2 wherein said copy and original document output stations each include means for stacking the copies and original documents respectively in face-up orientation and in the same order.

4. The apparatus set forth in claim 3 wherein said loading station includes stack feeder means for feeding a stack of the original documents in face-up orientation, one at a time to said document transport means.

5. The apparatus set forth in claim 2 wherein said optical means includes means for selectively changing the length of said optical path and means for correspondingly adjusting the focus of said image, whereby the size of said focused image at said radiation sensitive means may be changed.

6. The apparatus set forth in claim 2 wherein said optical means comprises an optical assembly generally straddling said loading station between said radiation means and said radiation sensitive means, said assembly including image handling means normally reflecting the original image to said radiation sensitive means,
    projection means operatively connected to said assembly for producing a projected image, said image handling means normally being disposed between said projection means and said radiation sensitive means,
    and means for effectively removing said image handling means from the path of said projected image to said radiation sensitive means to permit focusing of said projected image thereon.

* * * * *